United States Patent
Takada et al.

(10) Patent No.: US 11,588,328 B2
(45) Date of Patent: Feb. 21, 2023

(54) ENERGY SUPPLY SYSTEM AND METHOD FOR PLURALITY OF GRIDS FOR ENERGY DEMAND FROM SUPPLY RESOURCE

(71) Applicant: HONDA MOTOR CO., LTD., Tokyo (JP)

(72) Inventors: Sho Takada, Wako (JP); Yoshihiro Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 117 days.

(21) Appl. No.: 17/206,754

(22) Filed: Mar. 19, 2021

(65) Prior Publication Data

US 2021/0305811 A1    Sep. 30, 2021

(30) Foreign Application Priority Data

Mar. 25, 2020   (JP) .............................. JP2020-054885

(51) Int. Cl.

| | |
|---|---|
| *H02J 3/00* | (2006.01) |
| *G06Q 10/06* | (2012.01) |
| *G06Q 50/06* | (2012.01) |
| *G05B 19/042* | (2006.01) |

(Continued)

(52) U.S. Cl.
CPC .............. *H02J 3/004* (2020.01); *B60L 53/60* (2019.02); *G05B 19/042* (2013.01); *G06Q 10/06315* (2013.01); *G06Q 50/06* (2013.01); *G05B 2219/2639* (2013.01)

(58) Field of Classification Search
CPC .......... H02J 3/004; H02J 2310/10; H02J 9/06; H02J 4/00; B60L 53/60; B60L 53/665; B60L 53/63; B60L 55/00; G05B 19/042; G05B 2219/2639; G06Q 10/06315; G06Q 50/06; G06Q 10/06313; Y02E 60/00; Y02T 10/70; Y02T 10/7072; Y02T 90/12; Y02T 90/167; Y04S 30/14; Y04S 10/126
See application file for complete search history.

(56) References Cited

U.S. PATENT DOCUMENTS

| | | | |
|---|---|---|---|
| 10,212,787 B2 * | 2/2019 | Sierla ..................... | H05B 45/10 |
| 11,270,243 B1 * | 3/2022 | Roy ........................ | H02J 3/322 |
| 11,416,796 B2 * | 8/2022 | Przybylski ........ | G06Q 10/06315 |

(Continued)

FOREIGN PATENT DOCUMENTS

| | | |
|---|---|---|
| JP | 2011-36074 A | 2/2011 |
| JP | 2019-197425 A | 11/2019 |

*Primary Examiner* — Ramesh B Patel
(74) *Attorney, Agent, or Firm* — WHDA, LLP

(57) ABSTRACT

An energy supply system comprises a plurality of grids that include an energy supply source and demanding equipment that demands energy supplied from the energy supply source, and a first management unit that manages the plurality of grids. Each of the plurality of grids includes a second management unit configured to control the energy supply source and the demanding equipment and adjust demand and supply of energy inside the grid. The first and second management unit include: a first obtainment unit that obtains states of the grids; a judgment unit that judges whether a supply of energy from an outside of the grids is necessary based on a result obtained by the first obtainment unit; and a supply unit that supplies energy to a grid that has been judged to be in need of energy supply from an outside.

13 Claims, 6 Drawing Sheets

(51) Int. Cl.
*B60L 53/60* (2019.01)
*G06Q 10/0631* (2023.01)

(56) References Cited

U.S. PATENT DOCUMENTS

| | | | | |
|---|---|---|---|---|
| 2011/0040666 | A1* | 2/2011 | Crabtree | G06Q 50/06 |
| | | | | 702/179 |
| 2013/0262197 | A1* | 10/2013 | Kaulgud | H02J 3/001 |
| | | | | 705/14.1 |
| 2014/0039709 | A1* | 2/2014 | Steven | G06Q 10/06 |
| | | | | 700/291 |
| 2014/0277788 | A1* | 9/2014 | Forbes, Jr. | H02J 3/14 |
| | | | | 700/286 |
| 2015/0094968 | A1* | 4/2015 | Jia | G05B 15/02 |
| | | | | 702/60 |
| 2017/0003700 | A1* | 1/2017 | Pavlovski | H02J 3/003 |
| 2017/0005515 | A1* | 1/2017 | Sanders | H02J 3/381 |
| 2017/0176965 | A1* | 6/2017 | Martin Lloret | G06Q 50/06 |
| 2017/0347433 | A1* | 11/2017 | Sierla | G06V 20/54 |
| 2019/0393723 | A1* | 12/2019 | Pavlovski | H02J 3/38 |
| 2021/0194245 | A1* | 6/2021 | Tobin | H02J 3/008 |
| 2021/0305811 | A1* | 9/2021 | Takada | B60L 53/60 |

* cited by examiner

ENERGY SUPPLY SYSTEM AND METHOD FOR PLURALITY OF GRIDS FOR ENERGY DEMAND FROM SUPPLY RESOURCE

CROSS-REFERENCE TO RELATED APPLICATION(S)

This application claims priority to and the benefit of Japanese Patent Application No. 2020-054885 filed on Mar. 25, 2020, the entire disclosure of which is incorporated herein by reference.

BACKGROUND OF THE INVENTION

Field of the Invention

The present invention relates to an energy supply system and an energy supply method.

Description of the Related Art

Japanese Patent Laid-Open No. 2011-36074 describes a next-generation energy station provided with apparatuses that can supply, take, and store electricity, liquid hydrogen, natural gas, and the like, as well as energy-demanding sites (households) in a certain area around this next-generation energy station. Also, it is described in Japanese Patent Laid-Open No. 2011-36074 that the next-generation energy station and the energy-demanding sites are connected to an electricity network of an electricity company. Furthermore, it is described in Japanese Patent Laid-Open No. 2019-197425 that a user who owns electricity generation equipment can practically store electricity by depositing surplus electricity without preparing an electricity storage battery on his/her own, and can obtain the amount of electricity larger than the amount of deposited electricity when electricity is returned.

Meanwhile, in recent years, a microgrid is known that has energy supply sources and pieces of energy consumption equipment inside a community as it utilizes pieces of small-scale electricity generation equipment as distributed power sources without relying on electricity supply from a large-scale power plant.

SUMMARY OF THE INVENTION

The present invention provides an energy supply system and an energy supply method that realize an energy backup system for grids.

The present invention in its first aspect provides an energy supply system including: a plurality of grids that include an energy supply source and demanding equipment that demands energy supplied from the energy supply source; and a first management unit configured to manage the plurality of grids, wherein each of the plurality of grids includes a second management unit configured to control the energy supply source and the demanding equipment and adjust demand and supply of energy inside the grid, and the first management unit and the second management unit include: a first obtainment unit configured to obtain states of the grids; a judgment unit configured to judge whether a supply of energy from an outside of the grids is necessary based on a result obtained by the first obtainment unit; and a supply unit configured to supply energy to a grid that has been judged by the judgment unit to be in need of energy supply from an outside.

The present invention in its second aspect provides an energy supply method executed by an energy supply system including: a plurality of grids that include an energy supply source and demanding equipment that demands energy supplied from the energy supply source; and a first management unit configured to manage the plurality of grids, wherein each of the plurality of grids includes a second management unit configured to control the energy supply source and the demanding equipment and adjust demand and supply of energy inside the grid, and the energy supply method includes, with use of the first management unit and the second management unit, obtaining states of the grids, judging whether a supply of energy from an outside of the grids is necessary based on an obtained result, supplying energy to a grid that has been judged to be in need of energy supply from an outside.

The present invention can realize an energy backup system for grids.

DESCRIPTION OF THE EMBODIMENTS

Figure 1:
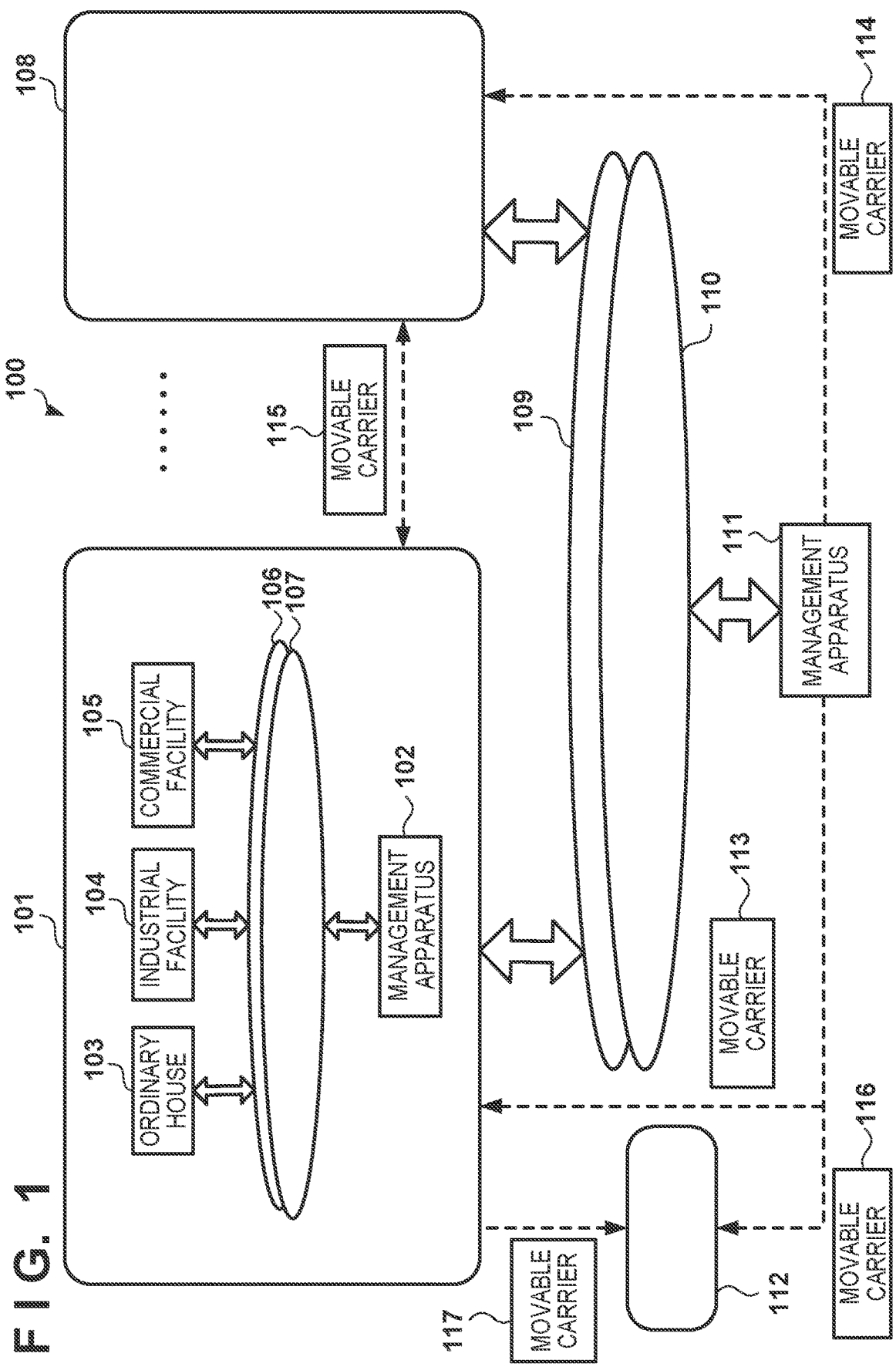
FIG. 1 is a diagram showing a configuration of an energy backup system.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

A microgrid is a grid component that has energy supply sources and pieces of energy-demanding equipment inside a community; for example, when the balance between demand and supply of electricity inside a grid is lost, or at the time of disaster, it is expected that an energy backup becomes necessary for the grid itself. Neither Japanese Patent Laid-Open No. 2011-36074 nor Japanese Patent Laid-Open No. 2019-197425 mentions an energy backup system for grids. According to one aspect of the present invention, an energy backup system for grids can be realized.

First Embodiment

FIG. 1 is a diagram showing a configuration of an energy backup system 100 (hereinafter simply referred to as a system 100) for microgrids according to the present embodiment. The system 100 includes microgrids 101, 108. The microgrids 101, 108 are energy networks that have energy supply sources and pieces of energy consumption equipment inside a community without relying on, for example, electricity supply from a large-scale power plant. Although FIG. 1 shows only the microgrids 101, 108, the number of the microgrids is not limited to the number shown in FIG. 1. Also, although the microgrids 101, 108 do not rely on, for example, electricity supply from a large-scale power plant, they may be connected to a large-scale electricity transmission system. Furthermore, the system 100 includes an off grid 112, such as a remote island, that is not connected to a large-scale electricity transmission system and a management apparatus 111.

In the present embodiment, the balance between demand and supply of energy is adjusted among microgrids at normal times, and in addition, an energy backup system for each of the microgrids 101, 108 is realized in case of emergency, such as at the time of disaster and at the time of blackout. Each of the microgrids 101, 108, has a function of adjusting the balance between demand and supply of energy thereinside. According to the present embodiment, the inter-microgrid balance between demand and supply of energy can be further adjusted. For example, when the microgrid 101 temporarily has surplus electricity, the microgrid 101 can supply electricity to the microgrid 108 that is in danger of a temporary shortage of electricity (mutual support). Also, in case of emergency, such as at the time of disaster and at the time of blackout, there may be a case where the balance between demand and supply of energy inside a microgrid is difficult to adjust. In preparation for this case, in particular, each microgrid pays an insurance fee to the management apparatus 111, or provides electricity to the management apparatus 111, so that electricity can be preferentially supplied thereto.

In the present embodiment, the management apparatus 111 that performs overall control of a plurality of microgrids inside the system 100, is configured. At normal times, energy can be supplied between microgrids. Then, in case of emergency, the management apparatus 111 performs control so as to supply energy to a microgrid that has been determined to be in need of energy supply. As shown in FIG. 1, the management apparatus 111 and the microgrids 101, 108, as well as the microgrid 101 and the microgrid 108, are interconnected via an energy network 109 and a communication network 110. For example, energy supply is realized via the energy network 109. The communication network 110 is a wired and/or wireless network, and enables, for example, data communication between management apparatuses.

In the present embodiment, a plurality of methods are possible as a method of supplying energy to microgrids. For example, in case of emergency, the management apparatus 111 supplies energy reserved in an energy reservoir apparatus installed in itself to a microgrid that has been determined to be in need of energy supply. Also, for example, the management apparatus 111 makes a request for energy supply to a microgrid that has been determined to be in need of energy supply from another microgrid. At normal times, energy supply between microgrids is realized by, for example, negotiation between microgrids. For example, a microgrid that is in danger of a shortage of electricity requests another microgrid to supply energy, and receives energy supply from a microgrid that can supply energy.

In the present embodiment, energy supply via a movable carrier is realized in addition to energy supply via the energy network 109. Here, it is sufficient for the movable carrier to be an apparatus capable of transporting energy, and the movable carrier is, for example, an electric automobile (EV) or a drone. Alternatively, the movable carrier may be a vehicle equipped with a small electric generator. In this case, the vehicle may not be an electric automobile. In the present embodiment, energy can be supplied to the off grid 112 by enabling energy supply via a movable carrier. Also, energy can be supplied also in, for example, a case where infrastructure is cut off due to disaster and the like between the management apparatus 111 and each microgrid, between microgrids, and the like. In FIG. 1, a movable carrier 113 is a movable carrier used in energy supply from the management apparatus 111 to the microgrid 101. Also, a movable carrier 114 is a movable carrier used in energy supply from the management apparatus 111 to the microgrid 108. Furthermore, a movable carrier 115 is a movable carrier used in energy supply between the microgrid 101 and the microgrid 108. Furthermore, a movable carrier 116 is a movable carrier used in energy supply from the management apparatus 111 to the off grid 112. Furthermore, a movable carrier 117 is a movable carrier used in energy supply from the microgrid 101 to the off grid 112.

Note, although electrical energy is described as one example of energy in the present embodiment, energy is not limited to electrical energy, and may be, for example, thermal energy.

Each of the microgrids 101, 108 includes, for example, a management apparatus 102, an ordinary house 103, an industrial facility 104, and a commercial facility 105. Hereinafter, the ordinary house 103, the industrial facility 104, and the commercial facility 105 may be collectively referred to as demanding parties. While the microgrid 101 will be described as a representative example of the microgrid 101 and the microgrid 108, the constitution of demanding parties can vary with each microgrid. The ordinary house 103 is, for example, a smart house that has electricity generation equipment (an energy supply source), such as solar panels and fuel cells, electricity storage equipment, an energy management system (EMS) that utilizes IoT (Internet of Things) data, and so forth. Furthermore, the industrial facility 104 and the commercial facility 105, which are respectively a factory and a commercial building, for example, also have electricity generation equipment, electricity storage equipment, an energy management system, and so forth. The management apparatus 102 has a function of adjusting the balance between demand and supply of energy inside the microgrid 101, and a function of controlling voltages and frequencies. Respective blocks inside the microgrid 101 are interconnected via an energy network 106 and a communication network 107. The energy network 106 includes an EMS network; for example, the management apparatus 102 adjusts the balance between demand and supply of energy inside the microgrid 101 via the energy network 106. The communication network 107 is a wireless and/or wired network; for example, IoT data is exchanged between the ordinary house 103 and the management apparatus 102 via the communication network 107.

Figure 3:
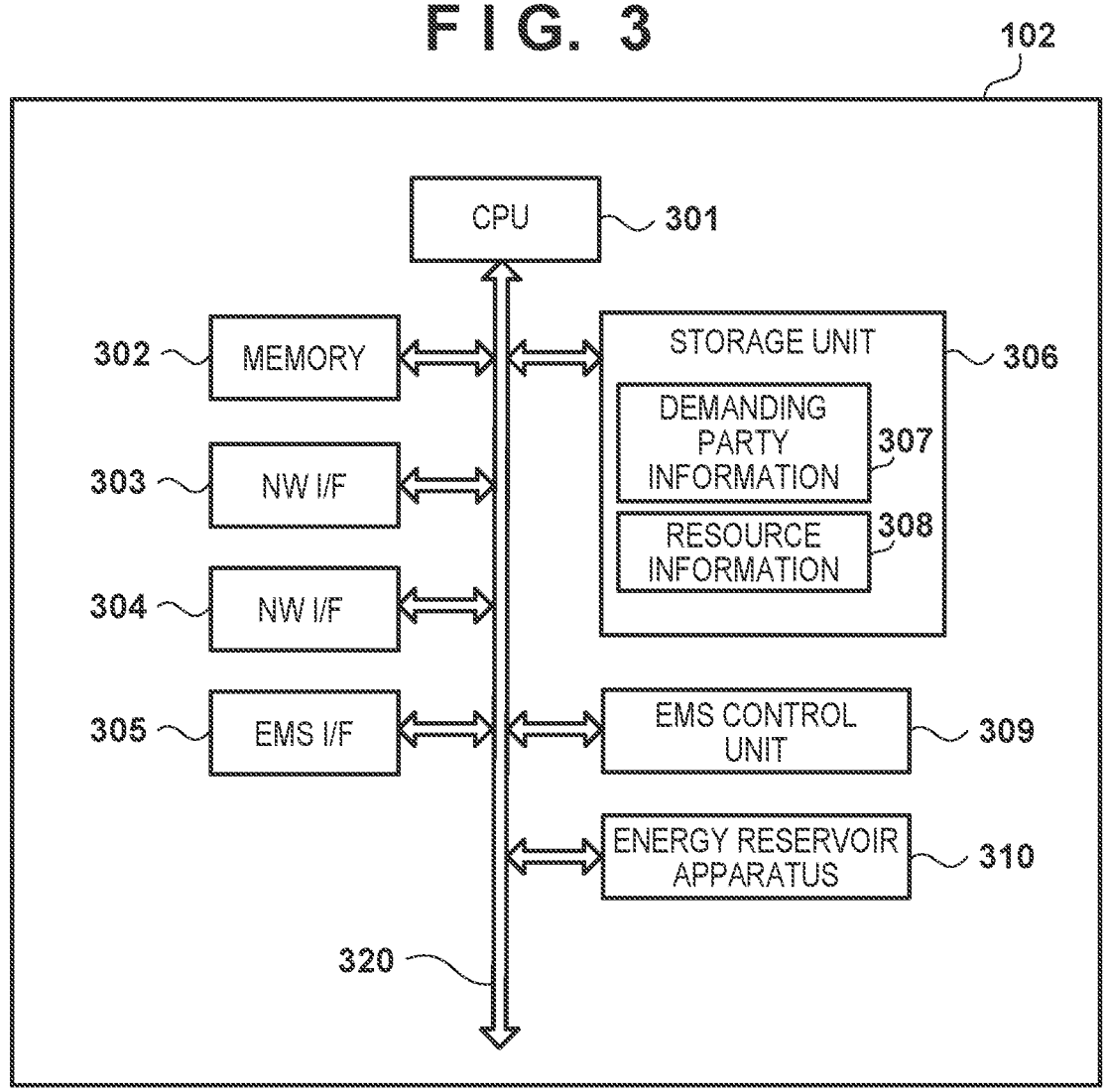
FIG. 3 is a diagram showing a configuration of a management apparatus.

FIG. 3 is a diagram showing a configuration of the management apparatus 102. While the management apparatus 102 performs overall control of a plurality of resources inside the microgrid 101, it may function as, for example, an aggregator for a VPP (Virtual Power Plant) system. Respective blocks shown in FIG. 3 are interconnected in a communication-enabled manner via a system bus 320. A CPU 301 integrally controls the management apparatus 102. The operations of the management apparatus 102 according to the present embodiment are realized by, for example, reading out a program stored in a storage unit 306 to a memory 302 and executing the program. The storage unit 306 stores a basic program, data, and the like for the operations of the management apparatus 102, and additionally, parameters, data, and the like that are necessary for an EMS control unit 309 to control the activities of respective resources of demanding parties. Here, the demanding parties are equivalent to the ordinary house 103, the industrial facility 104, and the commercial facility 105 of FIG. 1. The storage unit 306 also stores demanding party information 307 and resource information 308. The storage unit 306 may further store a market transaction program that provides a function of performing a trade in an electricity market.

The demanding party information 307 is information related to demanding parties, and includes, for example, such information as address information, residence information, family compositions, and contact information, the amount of increase/decrease in the amount of electricity demand that demanding parties can cope with, and information indicating what kind of electrical devices are owned by demanding parties. In the case of the ordinary house 103, owned electrical devices include, for example, air conditioning devices, lighting devices, electrical household appliances, an electricity generation system (e.g., solar panels), an electricity storage system (e.g., an onboard battery of an electric automobile (EV)), and so forth.

The resource information 308 is information related to the resources of demanding parties. Here, the resources denote the aforementioned devices and systems. The resource information 308 includes, for example, device information, such as a model, a model number, an activation period, a stabilization period, the amount of electricity generation, standby power, energy efficiency, maintenance information, a failure history, an operation history, the year, month, and date of purchase, and uptime. Also, the resource information additionally includes information related to environmental loads of each resource; for example, it includes the amount of $CO_2$ (carbon dioxide) emission, noise, the amount of vibration, and emission (electrical noise). Furthermore, the resource information 308 may include output information corresponding to the types of resources; for example, it may include temperature information in connection with an electrical water heater or a floor heating device. Moreover, the resource information 308 may include information related to a traveled distance in connection with an electric automobile. The information related to the traveled distance includes, for example, a cumulative traveled distance, as well as scheduled travel information indicating the next scheduled date and time of travel, scheduled amount of travel, and so forth. The next scheduled date and time of travel, for example, may be estimated from the result of monitoring of the resource information 308, or may be obtained from an operation plan submitted from a demanding party or a user interface. The resource information 308 may further include other information obtained from the foregoing pieces of information. For example, the resource information 308 may include resource life information obtained from the maintenance information and the year, month, and date of purchase. The resource information 308 may further include IoT data (e.g., sensor information) obtained from an HEMS (Home Energy Management System) in which an energy management system is configured.

The EMS control unit 309 controls respective resources of demanding parties via the EMS network. For example, in adjusting the balance between demand and supply of energy, the EMS control unit 309 executes electrical discharge from an electricity storage battery connected to a photovoltaics device. An EMS interface (EMS I/F) 305 is an interface for enabling communication with the EMS network. Also, a network interface (NW I/F) 303 is an interface for enabling connection to the networks 106 and 107. In the illustration of FIG. 3, the interfaces for the network 106 and the interfaces for the network 107 are shown as the same entities for the sake of simplicity. Furthermore, a network interface (NW I/F) 304 is an interface for enabling connection to the networks 109 and 110. In the illustration of FIG. 3, the interfaces for the network 109 and the interfaces for the network 110 are shown as the same entities for the sake of simplicity. An energy reservoir apparatus 310 can store surplus energy inside the microgrid 101, for example, surplus electricity. In the present embodiment, electricity stored in the energy reservoir apparatus 310 can be provided to the management apparatus 111.

The management apparatus 102 includes blocks other than the ones shown in FIG. 3 as appropriate; for example, it includes a block that analyzes the statuses of electricity usage by respective resources of demanding parties. An EMS control unit 309 monitors information of the statuses of electricity usage by respective resources of demanding parties and the like via, for example, the EMS network, and can also collect, for example, a change in a battery capacity of an onboard battery of an electric automobile and the like in real time. Then, the aforementioned analyzation block analyzes, for example, the time slots in which respective resources are used and the like based on the result of monitoring performed by the EMS control unit 309. Then, for example, based on the result of analysis performed by the analyzation block, the management apparatus 102 predicts fluctuations in electricity demand in the microgrid 101 managed by the management apparatus 102, and plans the operations of respective resources of demanding parties. In the present embodiment, especially when a danger of a temporary shortage of electricity is predicted, a supply of electricity can be received from another microgrid.

Figure 4:
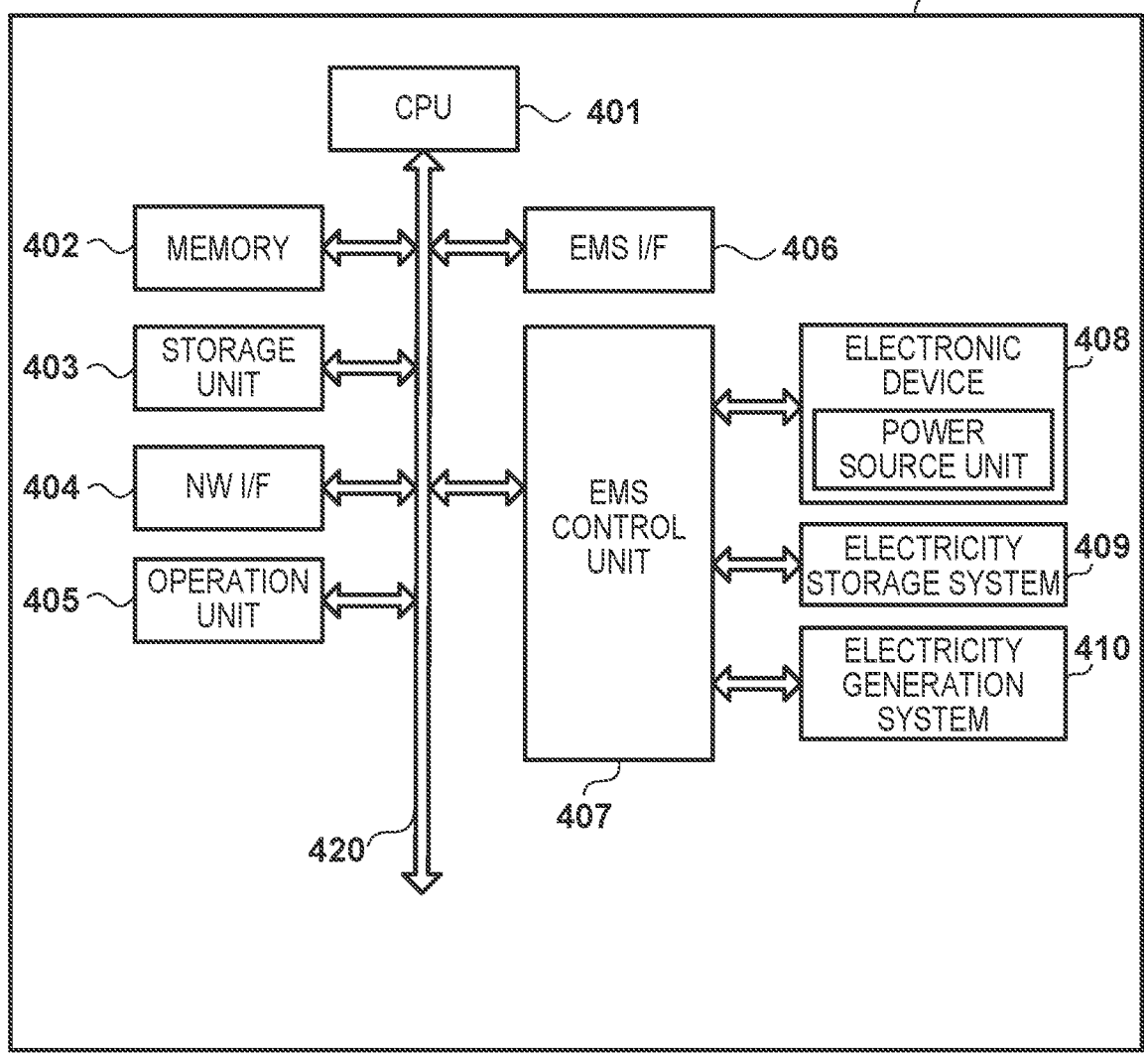
FIG. 4 is a diagram showing an EMS configuration of an ordinary house.

FIG. 4 is a diagram showing an EMS configuration of a demanding party. FIG. 4 shows an EMS configuration that is applicable to the ordinary house 103, the industrial facility 104, and the commercial facility 105 of FIG. 1; hereinafter, this will be described as an EMS configuration of the ordinary house 103 as one example. Respective blocks shown in FIG. 4 are interconnected in a communication-enabled manner via a system bus 420. The constituents shown in FIG. 4 may be configured as, for example, a control system for an HEMS of the ordinary house 103. A CPU 401 integrally controls the ordinary house 103. The operations of the ordinary house 103 according to the present embodiment are realized by, for example, reading out a program stored in a storage unit 403 into a memory 402 and executing the program. The storage unit 403 stores a basic program and data for the operations of the ordinary house 103, parameters and data that are necessary for an EMS control unit 407 to control the activities of respective resources, and so forth. The storage unit 403 may also store a market transaction program that provides a function of performing a trade in an electricity market.

An EMS interface (EMS I/F) 406 is an interface for enabling communication with the EMS network. Also, a network interface (NW I/F) 404 is an interface for enabling connection to the networks 106 and 107. In the illustration of FIG. 4, the interfaces for the network 106 and the interfaces for the network 107 are shown as the same entities for the sake of simplicity. The EMS control unit 407 controls the activities of respective resources of the ordinary house 103. In the present embodiment, the EMS control unit 407 activates respective resources, or stops the activities of respective resources, upon receiving a control instruction from the EMS control unit 308 of the management apparatus 102. An electronic device 408, an electricity storage system 409, and an electricity generation system 410 are resources whose activities are controlled by the EMS control unit 407. The electronic device 408 is, for example, a lighting fixture or an electrical household appliance. The electricity storage system 409 is, for example, an onboard battery of an electric automobile or a fuel-cell automobile, or an electricity storage device. Also, the electricity generation system 410 is, for example, a photovoltaics device. The EMS control unit 407 can improve the rate of self-sufficiency inside the ordinary house 103 by, for example, performing control so that the electricity storage system 409 and the electricity generation system 410 execute electrical discharge.

Figure 2:
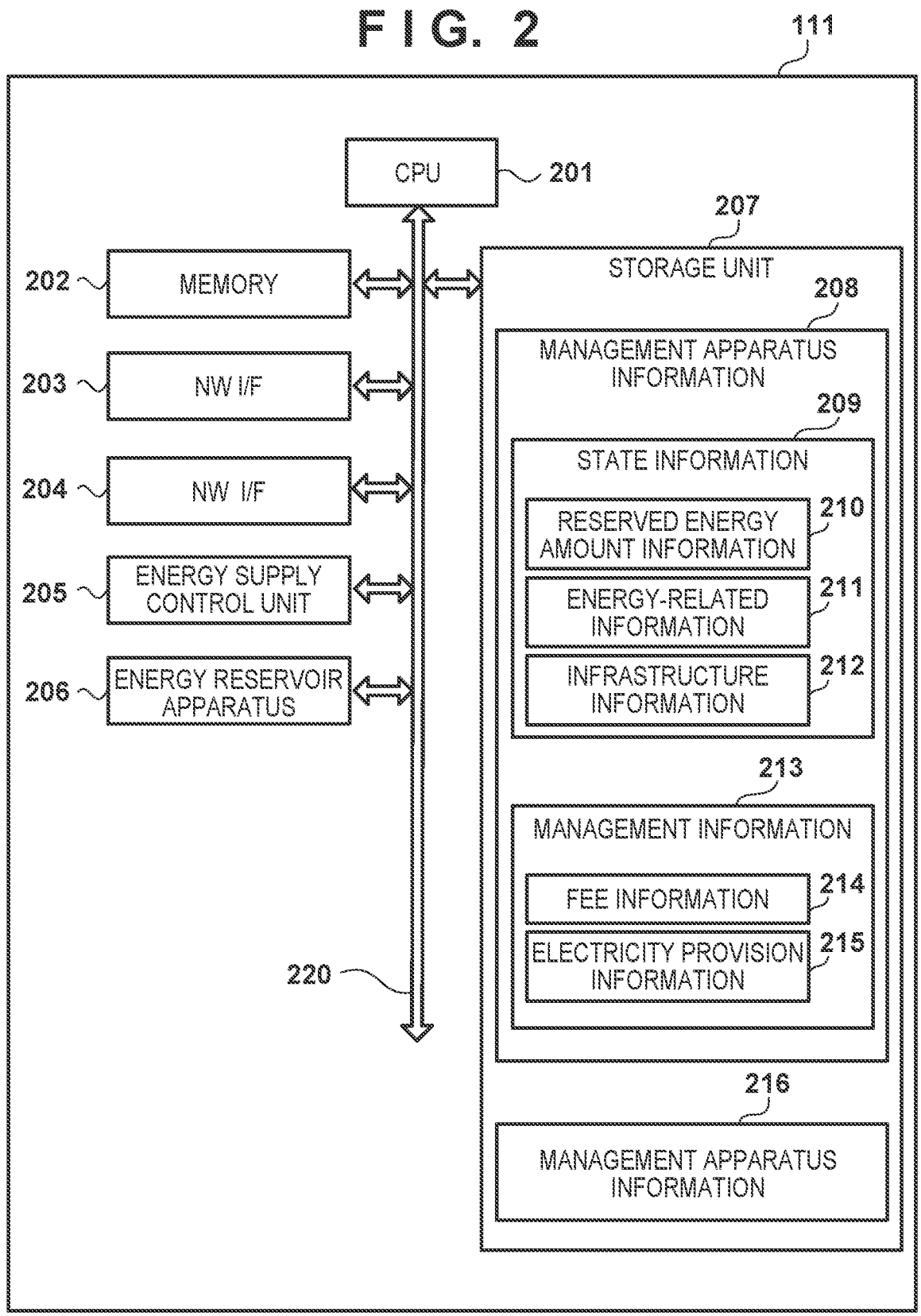
FIG. 2 is a diagram showing a configuration of a management apparatus.

FIG. 2 is a diagram showing a configuration of the management apparatus 111. Respective blocks shown in FIG. 2 are interconnected in a communication-enabled manner via a system bus 220. A CPU 201 integrally controls the management apparatus 111. The operations of the management apparatus 111 according to the present embodiment are realized by, for example, reading out a program stored in a storage unit 207 to a memory 202 and executing the program. The storage unit 207 stores a basic program, data, and the like for the operations of the management apparatus 111, and additionally, parameters, data, and the like that are necessary to control the management apparatus 102 in each microgrid. The storage unit 207 also stores a program for realizing the operations of the present embodiment. In the present embodiment, the management apparatus 111 performs overall control of a plurality of microgrids inside the system 110.

The storage unit 207 stores pieces of management apparatus information related to the management apparatuses 102 in respective microgrids. For example, management apparatus information 208 is information related to the management apparatus 102 in the microgrid 101, and management apparatus information 216 is information related to the management apparatus 102 in the microgrid 108. Hereinafter, the management apparatus information 208 will be described as an exemplary example of the management apparatus information 208 and the management apparatus information 216.

The management apparatus information 208 includes, for example, the content of a contract that is made by the management apparatus 102 in each microgrid with the management apparatus 111 in order to use an energy backup service according to the present embodiment. The energy backup service is a service in which each microgrid can receive energy supply from the management apparatus 111 or another microgrid when in short of energy at normal times/in case of emergency. For example, the management apparatus 102 in each microgrid can receive the energy backup service in case of emergency by concluding a contract with the management apparatus 111 and paying an insurance fee.

The content of the contract includes, for example, the terms of use related to the usage of information provided to the management apparatus 111, the type of the energy backup service, the area name, the type of electricity, and the destination/method of payment of the insurance fee. The type of the energy backup service is, for example, service category information indicating whether energy supply is to be received only at normal times, or whether energy supply is to be received also in case of emergency. In the present embodiment, the energy backup service can be received in case of emergency by paying the insurance fee. Furthermore, the energy backup service can be received in case of emergency also by providing surplus electricity reserved in the energy reservoir apparatus 310 of the management apparatus 102 to the management apparatus 111 in place of or in addition to the payment of the insurance fee. At this time, the amount of energy supply that can be received only by the payment of the insurance fee may differ from the amount of energy supply that can be received by the payment of the insurance fee and the provision of electricity. Furthermore, the content of the contract may also include information of electrical devices to be managed by the management apparatus 102. In the case of the ordinary house 103, the electrical devices to be managed include, for example, air conditioning devices, lighting devices, electrical household appliances, an electricity generation system (e.g., solar panels), an electricity storage system (e.g., an onboard battery of an electric automobile (EV)), and so forth. Also, the management apparatus information 208 may include information that the management apparatus 102 in each microgrid can obtain from a demanding party.

The management apparatus 111 monitors the management apparatus 102 in each microgrid, and information that has been obtained on an as-needed basis is stored as state information 209 of the management apparatus information 208. The state information 209 includes reserved energy amount information 210, energy-related information 211, and infrastructure information 212. The reserved energy amount information 210 is information indicating the amount of reserved energy (e.g., SOC (State Of Charge)) in the energy reservoir apparatus 310 of the management apparatus 102 in each microgrid. The energy-related information 211 is information related to the sources of energy supplied inside each microgrid, and is, for example, the amount of electricity generated by various types of electricity generation media (e.g., photovoltaics and wind power generation). Furthermore, the energy-related information 211 may include the amount of energy consumption by each resource. The infrastructure information 212 is information indicating the status of infrastructure to which each microgrid is connected, for example, such pieces of public infrastructure equipment as electricity transmission lines and roads between microgrids; for example, the infrastructure information 212 is information indicating disconnection of electricity transmission lines and sinkholes in roads. Furthermore, the infrastructure information 212 may also be infrastructure information inside the microgrid. The CPU 201 of the management apparatus 111 may obtain the infrastructure information 212 based on, for example, information obtained by accessing a map database or a weather database. The state information 209 may be not only data obtained in real time, but also up-to-date history data. Furthermore, the state information 209 may also be managed as big data, and may be managed in a database outside the management apparatus 111.

The management apparatus information 208 also includes management information 213 for determining the amount of energy supply to the microgrid in case of emergency. The management information 213 includes fee information 214 related to the insurance fee paid by the management apparatus 102 in each microgrid, and electricity provision information 215 indicating the amount of electricity provided by the management apparatus 102 in each microgrid.

An energy supply control unit 205 controls a supply of energy to each microgrid. For example, in case of emergency, the energy supply control unit 205 supplies energy to each microgrid via the energy network 109, and requests the management apparatus 102 in each microgrid to supply energy via the communication network 110. A network interface (NW I/F) 203 is an interface for enabling connection to the energy network 109. Also, a network interface (NW I/F) 204 is an interface for enabling communication with the communication network 110. For example, when it is detected that the reserved energy amount information 210 of the management apparatus 102 in the microgrid 101 is equal to or smaller than a threshold, the energy supply control unit 205 supplies energy via the network interface 203 and the energy network 109. An energy reservoir apparatus 206 reserves energy provided by the management apparatus 102 in each microgrid. For example, the energy reservoir apparatus 206 is an electricity reservoir apparatus that can reserve electricity through conversion into a liquid/solid energy resource.

The following describes the operations of the system 100 according to the present embodiment.

Figure 5:
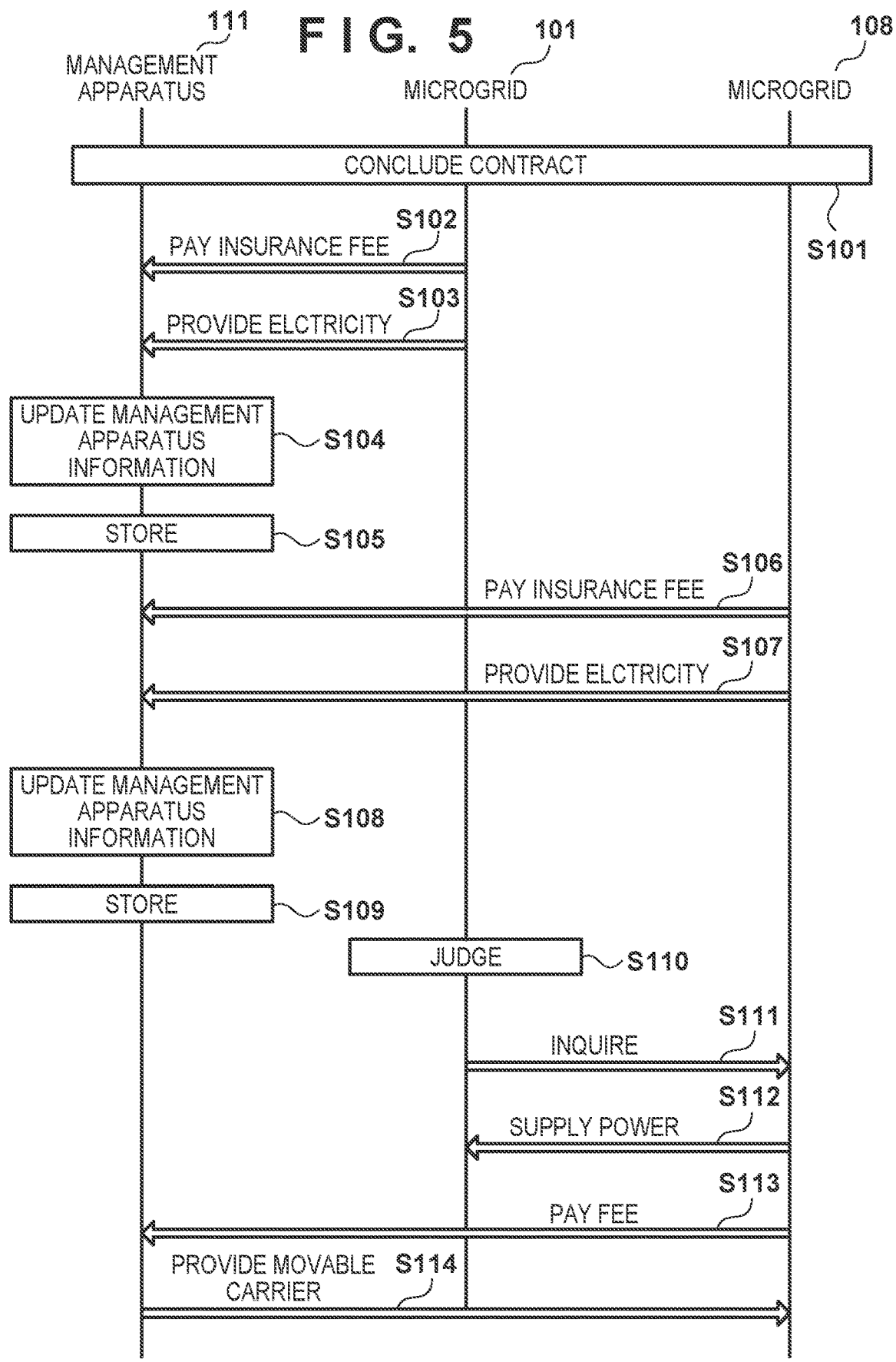
FIG. 5 is a diagram for describing the system operations at normal times.

FIG. 5 is a diagram showing the operations of the system 100 at normal times. First, in step S101, a contract regarding the energy backup service is concluded among the management apparatus 111, the microgrid 101, and the microgrid 108. It is assumed here that the management apparatuses 102 in the microgrids 101 and 108 apply to the management apparatus 111 for the contract. Applying for the contract refers to transmission of the content of the aforementioned contract from the management apparatuses 102 to the management apparatus 111. It is assumed here that the management apparatuses 102 in the microgrids 101 and 108 have concluded a contract that enables them to receive the energy backup service at normal times and in case of emergency.

In step S102, the management apparatus 102 in the microgrid 101 pays an insurance fee to the management apparatus 111 via the communication network 110. Also, when the amount of energy reserved in the energy reservoir apparatus 310 is equal to or larger than a threshold, the management apparatus 102 in the microgrid 101 assumes that there is surplus electricity, and provides the surplus electricity to the management apparatus 111 in step S103. The threshold for the assumed surplus electricity may be included in the content of the contract. Also, whether electricity is to be provided, or whether electricity is to be provided in place of the payment of the insurance fee, may be included in the content of the contract. Processing of steps S102 and S103 is selectively performed depending on the content of the contract. Steps S102 and S103 are performed at a regular interval, for example, monthly.

In step S104, the management apparatus 111 updates the management apparatus information 208. For example, the management apparatus 111 updates the fee information 214 based on the payment of the insurance fee in step S102, and updates the electricity provision information 215 based on the provision of electricity in step S103. Then, in step S105, the management apparatus 111 reserves the energy provided by the management apparatus 102 in the microgrid 101 in the energy reservoir apparatus 206.

In step S106, the management apparatus 102 in the microgrid 108 pays an insurance fee to the management apparatus 111 via the communication network 110. Also, when the amount of energy reserved in the energy reservoir apparatus 310 is equal to or larger than a threshold, the management apparatus 102 in the microgrid 108 assumes that there is surplus electricity, and provides the surplus electricity to the management apparatus 111 in step S107. The threshold for the assumed surplus electricity may be included in the content of the contract. Also, whether electricity is to be provided, or whether electricity is to be provided in place of the payment of the insurance fee, may be included in the content of the contract. Processing of steps S106 and S107 is selectively performed depending on the content of the contract. Steps S106 and S107 are performed at a regular interval, for example, monthly.

In step S108, the management apparatus 111 updates the management apparatus information 216. For example, the management apparatus 111 updates the fee information 214 in the management apparatus information 216 based on the payment of the insurance fee in step S106, and updates the electricity provision information 215 in the management apparatus information 216 based on the provision of electricity in step S107. Then, in step S109, the management apparatus 111 reserves the energy provided by the management apparatus 102 in the microgrid 108 in the energy reservoir apparatus 206.

In step S110, the management apparatus 102 in the microgrid 101 judges whether it is necessary to receive a supply of energy from another microgrid based on the result of monitoring of the resources of each demanding party inside the microgrid 101. For example, the management apparatus 102 estimates the amount of energy consumption in the next month based on a change in the amount of energy consumption by the resources of each demanding party inside the microgrid 101. Then, for example, the management apparatus 102 predicts that the amount of energy reserved in the energy reservoir apparatus 310 falls below a threshold, and judges that it is necessary to receive a supply of energy from another microgrid. When it is judged that it is necessary to receive a supply of energy from another microgrid, the management apparatus 102 in the microgrid 101 makes an inquiry to the management apparatus 102 in the microgrid 108, which is a party to the contract, about whether it can supply energy in step S111. This inquiry may include information about an energy supply medium (e.g., whether a movable carrier is to be used). When the management apparatus 102 in the microgrid 108 judges that it can supply energy based on, for example, the amount of energy reserved in the energy reservoir apparatus 310, it supplies energy to the management apparatus 102 in the microgrid 101 via the energy network 109 or the movable carrier 115 in step S112. The management apparatus 102 in the microgrid 101 reserves the energy supplied in step S110 in the energy reservoir apparatus 310 in itself, and uses the energy to adjust the balance between demand and supply of energy inside the microgrid 101.

In the present embodiment, the management apparatus 111 may store the energy reserved in the energy reservoir apparatus 206 in steps S105 and S109 to the movable carriers managed by the management apparatus 111. This configuration can realize distributed electricity storage. Also, these movable carriers may be provided to respective microgrids by lease and the like. For example, electricity may be stored to an electric automobile managed by the management apparatus 111, and this electric automobile may be provided to a microgrid. This case will be described in connection with steps S113 and S114.

In step S113, the management apparatus 102 in the microgrid 108 pays a usage fee for a movable carrier to the management apparatus 111 via the communication network 110. The usage fee for the movable carrier is, for example, a lease fee for an electric automobile. Then, in step S114, the management apparatus 111 provides the managed movable carrier to the management apparatus 102 in the microgrid 108. The movable carrier provided in step S114 is used as, for example, a resource inside the microgrid 108.

The fee paid in step S113 may be a fee for a specific service. For example, it may be a fee for an emergency charging service. The emergency charging service is a service in which, when a family electric automobile has stopped on a road due to a shortage in the amount of charge while traveling, emergency charging, for example, charging that is sufficient to enable travel to the nearest charging equipment, can be received by calling up the movable carrier managed by the management apparatus 111. In this case, the movable carrier provided in step S114 goes to, for example, a place where the family electric automobile of a person who requested this service has stopped.

FIG. 5 illustrates the microgrid 101 and the microgrid 108. However, the operations of FIG. 5 are applicable also to the off grid 112. However, in the case of the off grid 112, as there is no energy network between the off grid 112 and the management apparatus 111, the provision of electricity in steps S103 and S107, as well as the associated storing of electricity in steps S105 and S109, is not performed. In the present embodiment, even when the management apparatus 102 in the off grid 112 judges in step S110 that it is necessary to receive a supply of energy from another microgrid based on the result of monitoring of the resources of each demanding party inside the off grid 112, the management apparatus 102 can receive the supply of energy. That is to say, when the management apparatus 102 in the microgrid 108 judges that it can supply energy as a result of the inquiry made in step S111, energy is supplied to the management apparatus 102 in the off grid 112 via a movable carrier in step S112. Furthermore, the operation for the microgrid 108 described in step S114 is similarly performed; the movable carrier is provided to the off grid 112 as a resource or as emergency charging equipment. In this case, as a service unique to the off grid 112, the movable carrier may be provided as, for example, means of transportation between the off grid 112 and an area outside the off grid 112 (e.g., an urban location). As described above, according to the present embodiment, even the off grid 112 can become a party of the contract and receive the service of the system 100, similarly to other microgrids.

Figure 6:
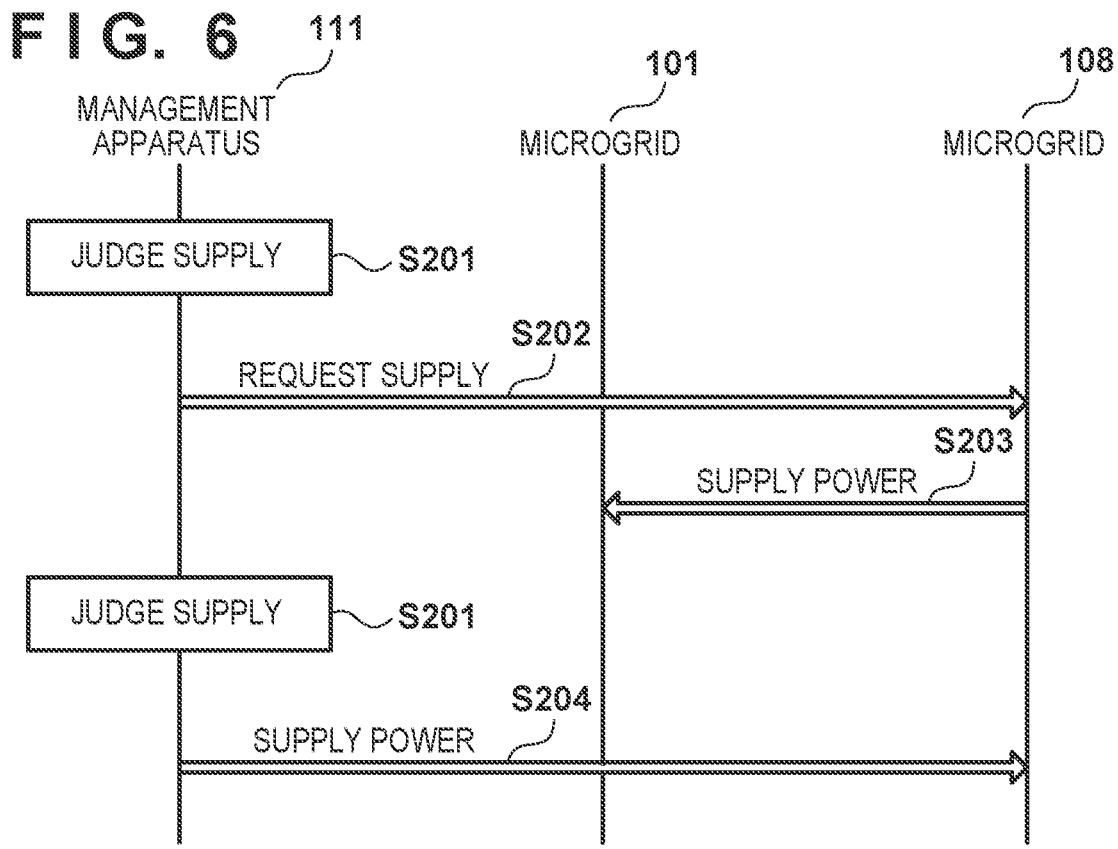
FIG. 6 is a diagram for describing the system operations in case of emergency.

FIG. 6 is a diagram showing the operations of the system 100 in case of emergency. The operations of FIG. 6 are performed when the management apparatus 111 has obtained information related to an emergency situation, such as blackout, from each microgrid (including the off grid 112) during the operations at normal times described using FIG. 5. As stated earlier, the management apparatus 111 monitors the management apparatus 102 in each microgrid, and information that has been obtained on an as-needed basis is stored as the state information 209 of the management apparatus information 208. Therefore, the operations of FIG. 6 may be performed when the amount of reserved energy falls below a threshold corresponding to an emergency situation based on the reserved energy amount information 210 corresponding to the management apparatus 102 in each microgrid. In step S201, the management apparatus 111 judges whether to supply energy in case of emergency.

Figure 7:
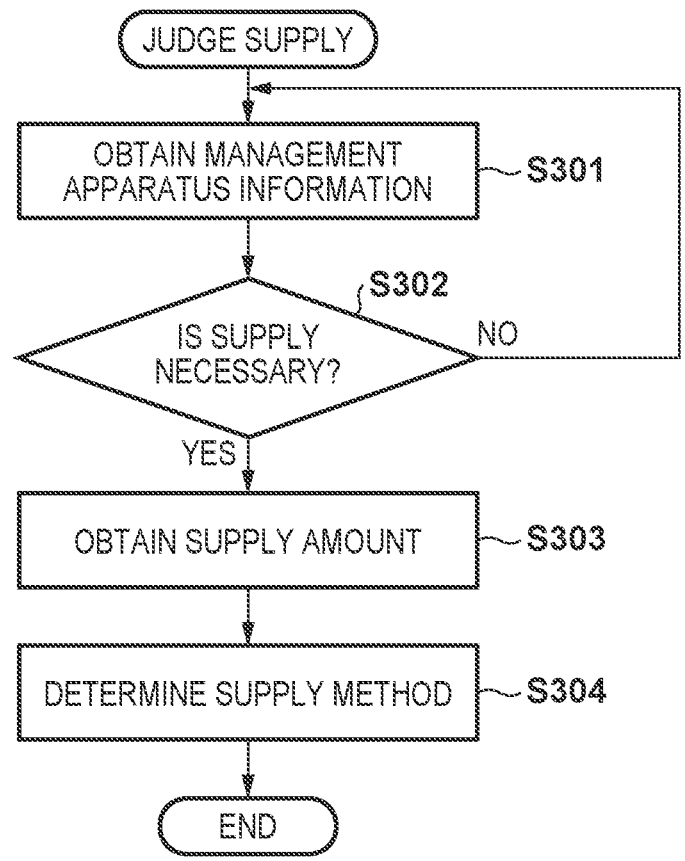
FIG. 7 is a flowchart showing processing for a judgement about energy supply.

FIG. 7 is a flowchart showing processing for the judgement about the supply in step S201. Processing of step S201 is realized by, for example, the CPU 201 loading a program stored in the storage unit 207 to the memory 202 and executing the program.

In step S301, the CPU 201 obtains, from the storage unit 207, the management apparatus information 208 corresponding to the management apparatus 102 in each microgrid. In step S302, the CPU 201 judges whether it is necessary to supply energy to the management apparatus 102 in a pertinent microgrid based on the reserved energy amount information 210. The judgment in step S302 may be made based on, for example, whether the amount of reserved energy indicated by the reserved energy amount information 210 falls below a threshold corresponding to an emergency situation. Alternatively, the judgment in step S302 may be made based on the fee information 214 and the electricity provision information 215. Here, when it is judged that energy supply is necessary, processing proceeds to step S303; when it is judged that energy supply is not necessary, processing is repeated from step S301. Note, in step S301, when information related to an emergency situation about a specific microgrid (e.g., disaster information) has been obtained, only the state information 209 corresponding to this microgrid may be obtained.

In step S303, the CPU 201 obtains the amount of energy supply to the management apparatus 102 in the microgrid that was judged to be in need of energy supply. For example, the state information 209 may be obtained, and the amount of energy supply may be calculated from the amount of reserved energy indicated by the current reserved energy amount information 210. Also, the necessary amount of energy supply may be estimated from up-to-date history data indicated by the state information 209. Furthermore, at the time of this estimation, weather information, such as a temperature and climate, as well as season information, may be used. Furthermore, a desired amount of energy supply in case of emergency may be obtained in advance in step S101 as the content of the contract. Furthermore, an addition may be further made to the obtained amount of energy supply based on the fee information 214 and the electricity provision information 215. For example, in a month next to a month in which the amount of provided electricity exceeded a standard amount of provided electricity, a predetermined supply amount may be added.

In step S304, the CPU 201 determines an energy supply method. For example, the CPU 201 determines the energy supply method based on the management apparatus information 208 obtained in step S301. The energy supply method may include a determination about an energy supply medium. For example, whether energy is to be supplied via the energy network 109, or whether energy is to be supplied via a movable carrier, is determined based on infrastructure information inside the microgrid that was judged to be in need of energy supply. Also, the energy supply method may include a determination about a main energy supplier. For example, a microgrid that can supply energy may be determined based on the amount of energy supply obtained in step S303. Furthermore, when there are a plurality of microgrids that were judged to be in need of energy supply, allocation of main energy suppliers (the management apparatuses 111, 102 and movable carriers) may be determined based on the fee information 214 and the electricity provision information 215 corresponding to each microgrid. For example, the allocation order may be determined so that the higher the paid insurance fee, or the larger the amount of provided energy, the higher the priority of energy supply. After step S304, processing of FIG. 7 is ended.

Reference is made to FIG. 6 again. Assume a case where the microgrid 101 is judged to be in need of energy supply and the microgrid 108 is determined to be a main energy supplier in step S201. In this case, in step S202, the management apparatus 111 requests the microgrid 108 to supply energy to the microgrid 101. At this time, information related to the determined content of the energy supply medium is also transmitted as a content of the request. In step S203, upon accepting the request from the management apparatus 111, the microgrid 108 supplies energy to the microgrid 101 in accordance with the content of this request. At this time, energy may be supplied to the management apparatus 102 in the microgrid 101, or energy may be supplied to a resource inside the microgrid 101.

On the other hand, assume a case where the microgrid 108 is judged to be in need of energy supply and the management apparatus 111 is determined to be a main energy supplier in step S201. In this case, in step S204, the management apparatus 111 supplies energy to the microgrid 108 based on the amount of energy supply obtained in step S303 and the energy supply method determined in step S304. At this time, energy may be supplied to the management apparatus 102 in the microgrid 108, or energy may be supplied to a resource inside the microgrid 108.

As described above, according to the present embodiment, the balance between demand and supply of energy is adjusted among microgrids at normal times, and in addition, an energy backup system for each of the microgrids is realized also in case of emergency, such as at the time of disaster and at the time of blackout. Also, as a movable carrier is used as one of energy backup means, energy can be supplied to an off grid, thereby enabling the off grid to become a party to a contract for the service of the present embodiment.

<Summary of Embodiment>

An energy supply system according to the aforementioned embodiment is an energy supply system including: a plurality of grids (101, 108) that include an energy supply source (410) and demanding equipment (408) that demands energy supplied from the energy supply source; and a first management unit (111) configured to manage the plurality of grids, wherein each of the plurality of grids includes a second management unit (102) configured to control the energy supply source and the demanding equipment and adjust demand and supply of energy inside the grid, and the first management unit and the second management unit include: a first obtainment unit (201, 301) configured to obtain states of the grids; a judgment unit (steps S110, S201) configured to judge whether a supply of energy from an outside of the grids is necessary based on a result obtained by the first obtainment unit; and a supply unit (steps S112, S203, S204) configured to supply energy to a grid that has been judged by the judgment unit to be in need of energy supply from an outside.

With this configuration, for example, energy can be supplied to a microgrid that has been judged to be in need of energy supply at normal times and in case of emergency.

Also, the first obtainment unit obtains a reserved amount of an energy reservoir unit (310) inside a grid from the second management unit, and the judgment unit judges that the grid from which the first obtainment unit has performed the obtainment is in need of energy supply from an outside when the obtained reserved amount falls below a threshold.

With this configuration, for example, when the amount of electricity stored in an energy reservoir apparatus of a management apparatus in a microgrid has fallen below a threshold, this microgrid can be judged to be in need of energy supply from the outside.

Also, the first management unit further includes a determination unit (steps S110, S304) configured to determine an energy supply method, and the supply unit supplies energy based on the energy supply method determined by the determination unit. Furthermore, determination of the energy supply method includes determination of a medium through which energy is supplied and a main supplier of energy. Furthermore, the medium through which energy is supplied includes at least one of an energy network (109) and a movable carrier (113, 114, 115, 116, 117). Furthermore, the movable carrier includes at least one of a vehicle, an electric generator, and an electricity storage device. Furthermore, the main supplier of energy includes at least one of the first management unit (111) and the grids (101, 108, 112).

With these configurations, a variety of media, such as an electricity network and an electric automobile, can supply energy to a microgrid that has been judged to be in need of energy supply from the outside.

Furthermore, the grids include at least one of a microgrid (101, 108) and an off grid (112).

With this configuration, the operations of the present embodiment can be applied also to an off grid.

Also, the first management unit further includes a second obtainment unit (301, 214) configured to obtain fee information from the second management unit, and the supply unit supplies energy when the second obtainment unit has obtained the fee information. In addition, the first management unit further includes a third obtainment unit (301, 215) configured to obtain energy from the second management unit, and the supply unit supplies energy when the third obtainment unit has obtained the energy. Moreover, the energy obtained by the third obtainment unit is surplus electricity in a grid from which the third obtainment unit has performed the obtainment.

With these configurations, for example, energy can be supplied to a microgrid that has been judged to be in need of energy supply from the outside based on an insurance fee obtained from a management apparatus in a microgrid and surplus electricity provided by the management apparatus in the microgrid.

Furthermore, based on a result of obtainment by the second obtainment unit and a result of obtainment by the third obtainment unit, the supply unit supplies energy preferentially to a grid from which the obtainments have been performed.

With this configuration, for example, the allocation order of energy supply is determined so that the larger the amount of provided energy, the higher the priority of energy supply.

The invention is not limited to the foregoing embodiments, and various variations/changes are possible within the spirit of the invention.

What is claimed is:

1. An energy supply system comprising a plurality of grids that include an energy supply source and demanding equipment that demands energy supplied from the energy supply source, and a first management unit configured to be provided outside the plurality of grids and manage the plurality of grids,
  wherein each of a first grid and a second grid included in the plurality of grids includes a second management unit configured to control the energy supply source and the demanding equipment and adjust demand and supply of energy inside the grid, and
  the first management unit includes:
    a first obtainment unit configured to obtain information of amount of energy from each of the second management unit of the first grid and the second management unit of the second grid;
    a judgment unit configured to judge whether a supply of energy from an outside of a grid is necessary based on the information of amount of energy obtained by the first obtainment unit; and
    in a case where the judgment unit judges that it is necessary for the first grid to supply from an outside of the first grid, and that it is not necessary for the second grid to supply from an outside of the second grid, a control unit configured to control the second management unit of the second grid to supply energy from the second grid to the first grid.

2. The energy supply system according to claim 1, wherein the first obtainment unit obtains, as the information of amount of energy, a reserved amount of an energy reservoir unit inside a grid from each of the second management unit of the first grid and the second management unit of the second grid, and
the judgment unit judges that a supply of energy from an outside of a grid is necessary when the obtained reserved amount falls below a threshold.

3. The energy supply system according to claim 1, wherein the first management unit further includes
a determination unit configured to determine an energy supply method, and
the supply of energy is performed based on the energy supply method determined by the determination unit.

4. The energy supply system according to claim 3, wherein determination of the energy supply method includes determination of a medium through which energy is supplied and a main supplier of energy.

5. The energy supply system according to claim 4, wherein the medium through which energy is supplied includes at least one of an energy network and a movable carrier.

6. The energy supply system according to claim 5, wherein the movable carrier includes at least one of a vehicle, an electric generator, and an electricity storage device.

7. The energy supply system according to claim 4, wherein the main supplier of energy includes at least one of the first management unit and the grids,
in a case where the first management unit is determined as the main supplier of energy, the control unit is configured to supply energy to the first grid.

8. The energy supply system according to claim 1, wherein the grids include at least one of a microgrid and an off grid.

9. The energy supply system according to claim 1, wherein the first management unit further includes a second obtainment unit configured to obtain fee information from each of the second management unit of the first grid and the second management unit of the second grid, and
the supply of energy is performed when the second obtainment unit has obtained the fee information.

10. The energy supply system according to claim 9, wherein the first management unit further includes
a third obtainment unit configured to obtain energy from the second management unit, and
the supply of energy is performed when the third obtainment unit has obtained the energy.

11. The energy supply system according to claim 10, wherein the energy obtained by the third obtainment unit is surplus electricity in the second grid.

12. The energy supply system according to claim 10, wherein, the supply of energy is preferentially performed based on a result of obtainment by the second obtainment unit and a result of obtainment by the third obtainment unit.

13. An energy supply method to be executed in an energy supply system comprising a plurality of grids that include an energy supply source and demanding equipment that demands energy supplied from the energy supply source, and a first management unit configured to be provided outside the plurality of grids and manage the plurality of grids,
wherein each of a first grid and a second grid included in the plurality of grids includes a second management unit configured to control the energy supply source and the demanding equipment and adjust demand and supply of energy inside the grid, and
the energy supply method includes,
in the first management unit,
obtaining information of amount of energy from each of the second management unit of the first grid and the second management unit of the second grid;
judging whether a supply of energy from an outside of a grid is necessary based on the obtained information of amount of energy; and
in a case where the judging judges that it is necessary for the first grid to supply from an outside of the first grid, and that it is not necessary for the second grid to supply from an outside of the second grid, controlling the second management unit of the second grid to supply energy from the second grid to the first grid.

* * * * *